United States Patent [19]

Moore et al.

[11] Patent Number: 4,794,620

[45] Date of Patent: Dec. 27, 1988

[54] RADIO FREQUENCY MODEM AND METHOD

[75] Inventors: John R. Moore; Richard P. Coupland, both of Phoenix, Ariz.

[73] Assignee: International Anasazi, Inc., Phoenix, Ariz.

[21] Appl. No.: 628,460

[22] Filed: Jul. 6, 1984

[51] Int. Cl.[4] .......................... H04B 1/04; H04B 3/50; H04L 27/02

[52] U.S. Cl. ........................................ 375/8; 375/70; 375/71; 375/98; 455/58; 455/73; 455/245; 455/116

[58] Field of Search .................. 375/5, 8, 76, 121, 70, 375/71, 98, 7, 59, 68, 72; 455/58, 73, 78, 79, 115, 116, 234, 245; 340/825.5; 381/107, 108

[56] References Cited

U.S. PATENT DOCUMENTS

| | | | |
|---|---|---|---|
| 3,500,458 | 3/1970 | Cannalte | 455/115 |
| 3,500,459 | 3/1970 | Battin et al. | 455/78 |
| 3,764,977 | 10/1973 | Weeden, Jr. | 375/8 |
| 3,825,829 | 7/1974 | Braun | 375/4 |
| 3,846,705 | 11/1974 | Davis | 375/59 |
| 3,909,727 | 9/1975 | Hughes et al. | 375/8 |
| 4,115,741 | 9/1978 | Skutta | 455/245 |
| 4,145,656 | 3/1979 | Merryman et al. | 455/73 |
| 4,199,663 | 4/1980 | Herzog | 370/85 |
| 4,229,827 | 10/1980 | Bowman | 375/8 |
| 4,238,779 | 12/1980 | Dickinson et al. | 375/8 |
| 4,242,753 | 12/1980 | Dolikian et al. | 375/71 |
| 4,272,845 | 6/1981 | Fiumani | 375/76 |
| 4,352,201 | 9/1982 | Miller | 455/58 |
| 4,384,356 | 5/1983 | Beerbaum | 375/8 |
| 4,387,337 | 6/1983 | Beeman | 375/59 |

*Primary Examiner*—Benedict V. Safourek
*Attorney, Agent, or Firm*—Limbach, Limbach & Sutton

[57] ABSTRACT

A radio frequency modulator/demodulator (modem) and method for receiving and transmitting data over a radio frequency data link. The modem has a transmitting section which includes a modulator which modulates a radio frequency signal in response to data provided by, for example, an associated processor. The transmitting section further includes a watchdog or enable circuit which monitors a request-to-send signal produced by the associated processor, with the request-to-send signal being present when the processor is generating data to be transmitted over the data link. The enable circuit will disable the modulator should a transmission exceed a maximum predetermined time period, thereby preventing the associated processor from monopolizing the data link in the event of a processor failure.

7 Claims, 6 Drawing Sheets

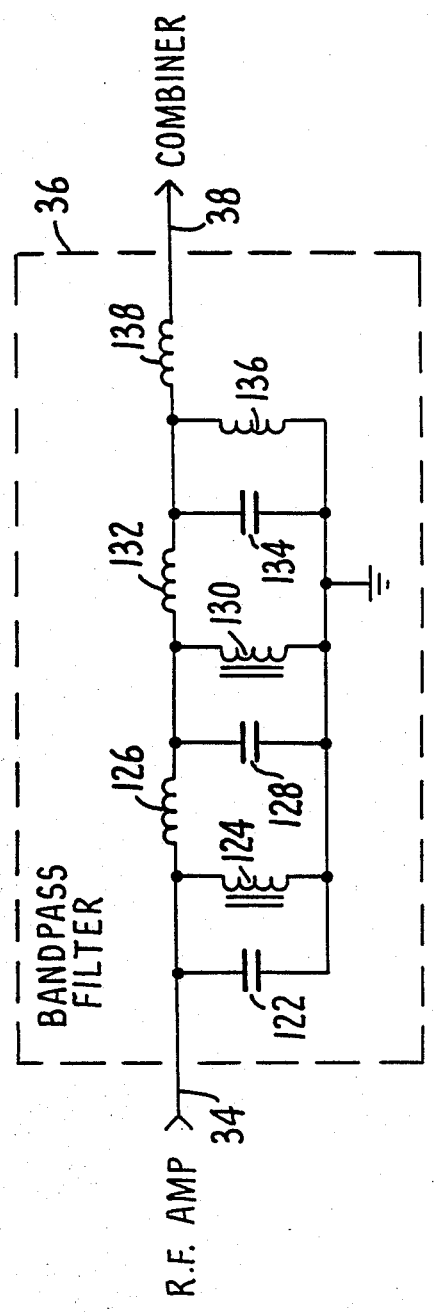
FIG. 3.
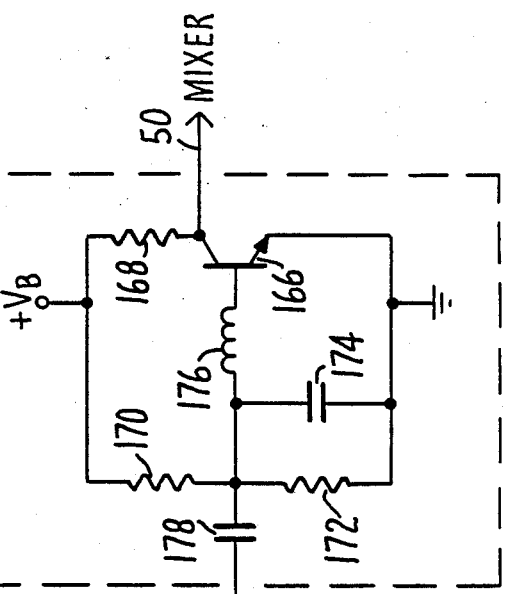
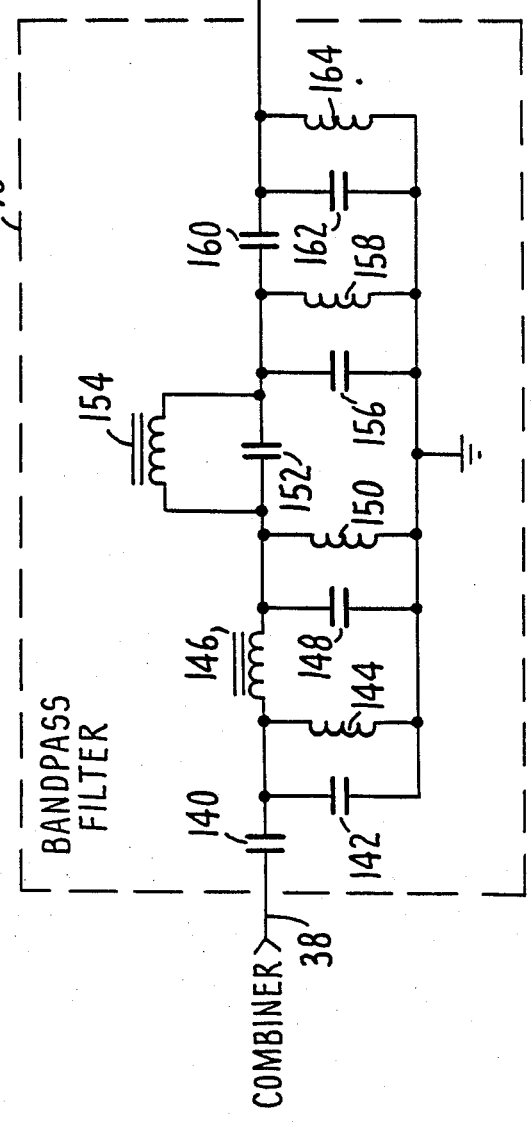
FIG. 4.

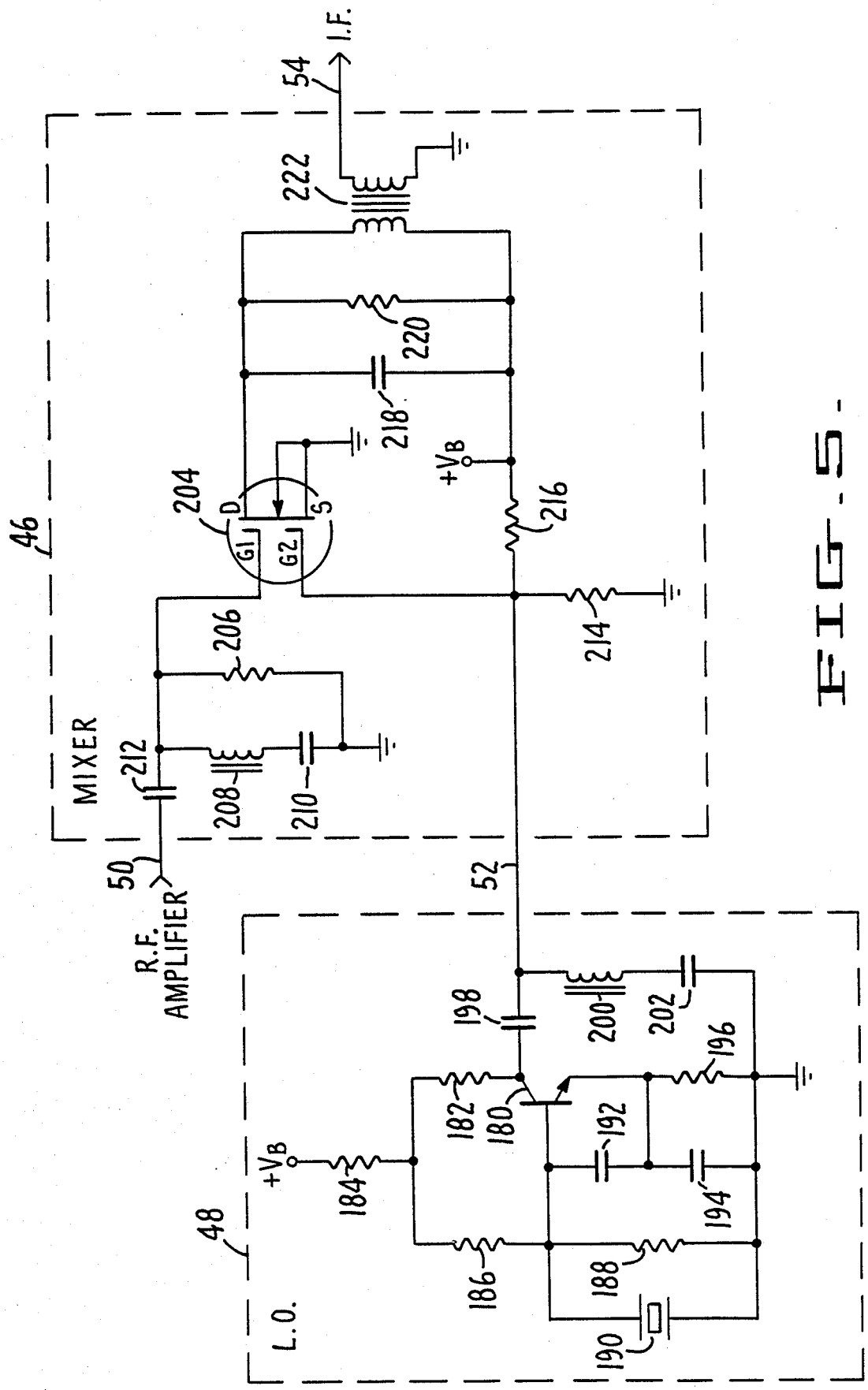

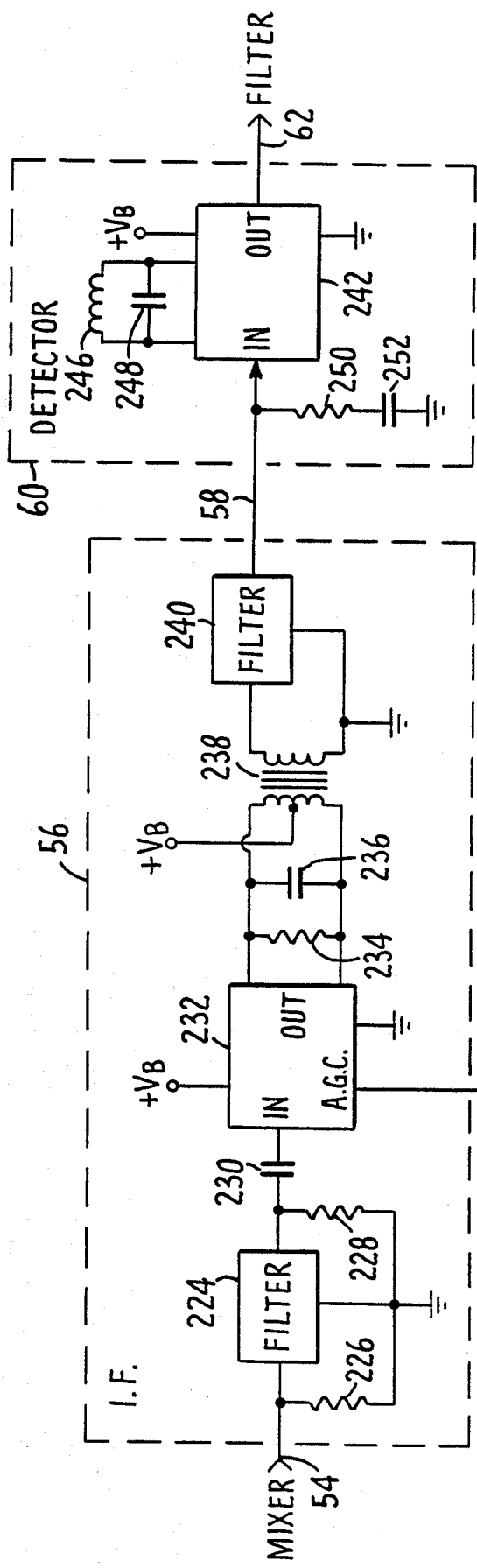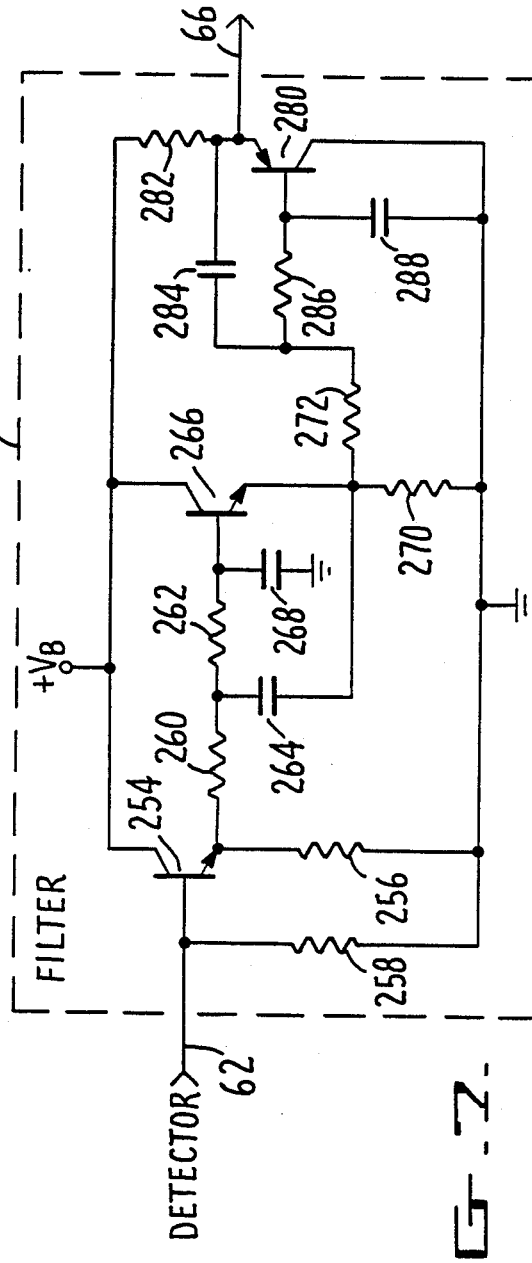

RADIO FREQUENCY MODEM AND METHOD

TECHNICAL FIELD

The subject invention generally pertains to the field of modulation/demodulation circuits, commonly referred to as modems, and more particularly, to a Radio Frequency (R.F.) modem and method for transmittin and receiving data over a hard-wired data link.

BACKGROUND ART

Radio Frequency (R.F.) modems are sometimes used in computer networks for establishing communication links between various computers in the network. In the event of a computer failure, it is possible that the failed computer will monopolize the link, thereby preventing other computers from using the link.

R.F. modems now in use are typically quite complex and frequently use specialized components, thereby greatly increasing the cost of the modem.

The disclosed R.F. modem and method overcomes the above-noted limitations in that the modem is relatively simple in construction and utilizes a large number of off-the-shelf components. In addition, the subject modem has the capability of terminating data transmissions onto the communication link when an associated processor utilizes the link for more than a predetermined time period.

These and other advantages of the subject invention will be apparent to those skilled in the art upon a reading of the following Best Mode of Carrying out the Invention together with the drawings.

DISCLOSURE OF THE INVENTION

A radio frequency modulator/demodulator (modem) and method for receiving and transmitting data over a radio frequency data link is disclosed. The modem includes a transmitting section means for producing a modulated R.F. output signal on the data link utilizing an input data signal received on a data input.

The transmitting section means further include an R.F. generating means for generating an unmodulated R.F. signal, an enable means for generating an enable signal for a maximum predetermined time period and a modulating means for producing the modulated output signal in response to the unmodulated R.F. signal, the enable signal and the input data signal.

The modem is typically used in conjunction with a processing unit which provides the data signal to be transmitted on the R.F. data link. In addition, the processing unit preferably produces a request-to-send signal whenever the processing unit is outputting data to be transmitted. In that case, the enable means preferably includes a timing circuit which is triggered by the request-to-send signal for producing the enable signal.

The modulating means of the transmitting section also preferably includes a gating means, such as a NAND gate, having one input coupled to the R.F. signal to be modulated and a second input coupled to the input data signal. The gating means causes the R.F. signal to be switched on and off in response to the input data signal thereby achieving, for example, keyed-carrier modulation.

BRIEF DESCRIPTION OF THE DRAWINGS

FIG. 3 is a schematic diagram of the output bandpass filter of the transmitter section of the subject invention.

FIG. 4 is a schematic diagram of the input bandpass filter and radio frequency amplifier of the receiver section of the subject radio frequency modem.

FIG. 5 is a schematic diagram of the mixer and local oscillator of the receiver section of the subject radio frequency modem.

FIG. 6 is a schematic diagram of the Intermediate Frequency amplifier and detector of the receiver section of the subject radio frequency modem.

FIG. 7 is a schematic diagram of the post-detector filter of the receiver section of the subject radio frequency modem.

BEST MODE FOR CARRYING OUT THE INVENTION

Figure 1:
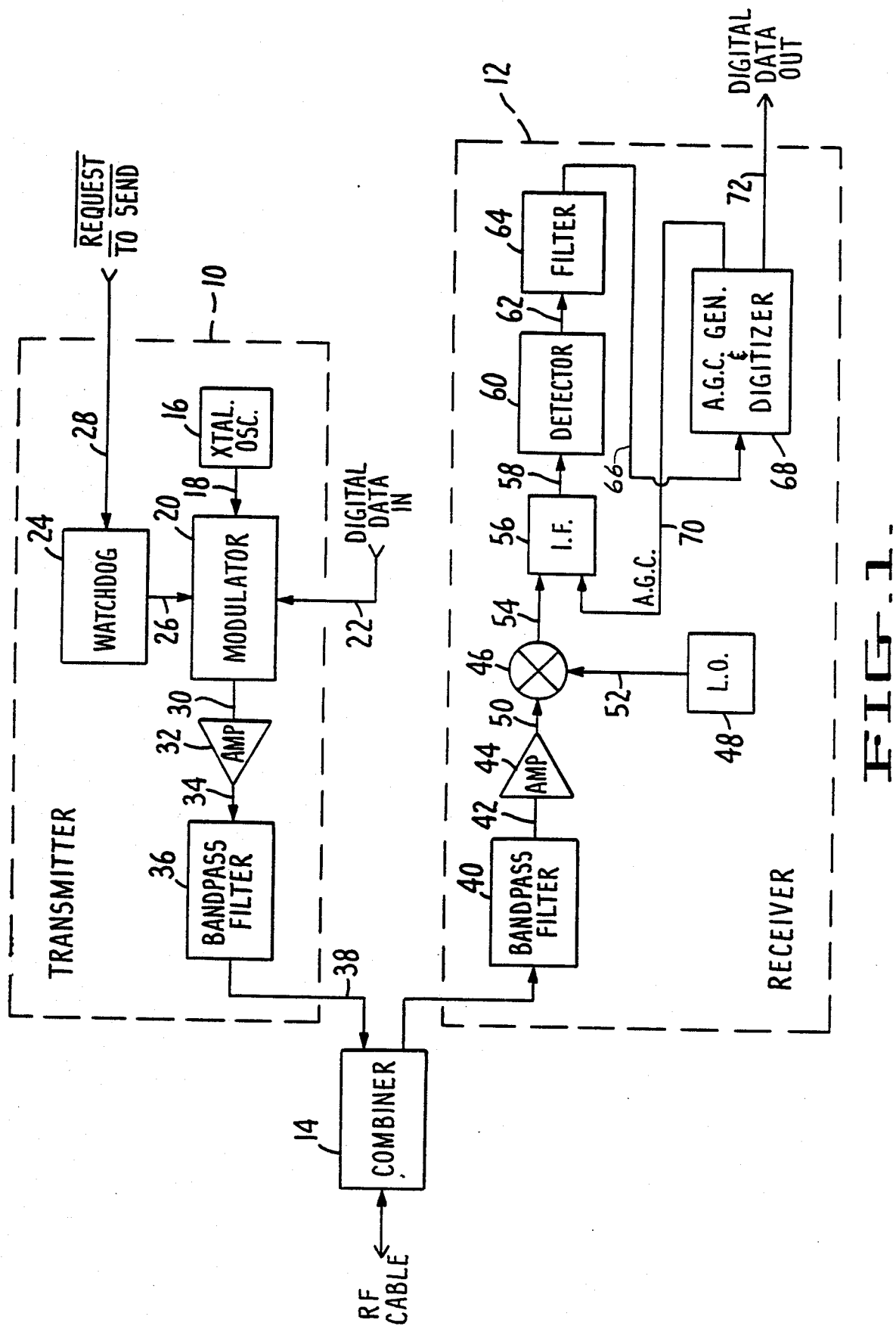
FIG. 1 is a simplified block diagram of the subject radio frequency modem.

Referring now to the drawings, the transmitter section 10 and receiver section 12 of the subject modem are coupled to a radio frequency data network through a combiner circuit 14. The network typically includes several remote stations each equipped with a computer and associated radio frequency modem and a central computer having an associated modem. The remote stations and central computer are connected together through a coaxial cable. Circuit 14 provides an RF path from the transmitter section output to the RF network and another RF path from the RF network to the input of the receiver section 22. The transmitter section of the subject modem is implemented to transmit amplitude modulated (AM) signals between 5 and 30 MHz and the receiver section is implemented to receive AM signals between 72 and 76 MHz. Other frequencies could be used as desired. The modem associated with the central computer is implemented to transmit and receive on compatible frequencies.

The front end of receiver section 12 includes a bandpass filter 40 having an input coupled to an output of combiner circuit 14. Filter 40 is implemented to provide a bandpass having a center frequency of approximately 73.85 MHz and a bandwidth of approximately 8 MHz. The output of filter 40 is coupled to the input of a radio frequency amplifier 44 via line 42. The output of amplifier 44 is, in turn, connected to one input of a mixer circuit 46 through line 50.

The remaining input of mixer 46 is coupled to the output of a local oscillator (L.O.) circuit 48 through line 52. L.O. 48 is implemented to provide a fixed output frequency of approximately 63.15 MHz. The output of mixer 46 on line 54, which has a difference frequency of approximately 10.7 MHz, is coupled to an Intermediate Frequency (I.F.) amplifier 56. The output of amplifier 56 is coupled to the input of an amplitude modulated (A.M.) detector circuit 60 by way of line 58.

The receiver section further includes a post-detector filter 64 which is connected to the output of AM detector 60 through line 62. The output of the post-detector filter is connected to an Automatic Gain Control (A.G.C.) generator and digitizer circuit 68. Circuit 68 produces an A.G.C. signal which is proportional to the amplitude of the filter 64 output and which is used to control the gain of I.F. amplifier 56. Circuit 68 also serves to provide a detected digital data output on line 72.

The transmitter section 10 of the subject R.F. modem includes a modulator 20 which receives digital data to be transmitted on line 22. The pulse rate of the digital data is typically on the order of approximately 154 kilobits per second or less. The R.F. signal to be modulated by modulator 20 is produced by a crystal oscillator 16 connected to the radio frequency input of the modulator by way of line 18. Oscillator 16 is implemented to produce a radio frequency signal having a frequency of 6.0 MHz. Modulator 20 further includes a control signal input which is coupled to a watchdog circuit 24 through line 26. Watchdog circuit 24, in turn, has an input coupled to a line 28 which carries a $\overline{\text{Request To Send}}$ signal. This signal is produced by the computer associated with the R.F. modem and is a logic "0" whenever the remote computer is transmitting data to the central computer. Similar signals are commonly used in communication links between computers. As will be subsequently described later in greater detail, watchdog circuit 24 prevents the transmitter section of the subject modem from transmitting onto the RF network for more than a predetermined amount of time thereby protecting the rest of the network against a failure of the subject modem or a failure of the data input source of the modem.

The amplitude modulated output of modulator 20 is coupled to a R.F. amplifier 32 by way of line 30. Amplifier 32 is followed by a high-Q bandpass filter 36 through line 34 and, as previously noted, the output of filter 36 is coupled to an input of combiner circuit 14.

Figure 2:
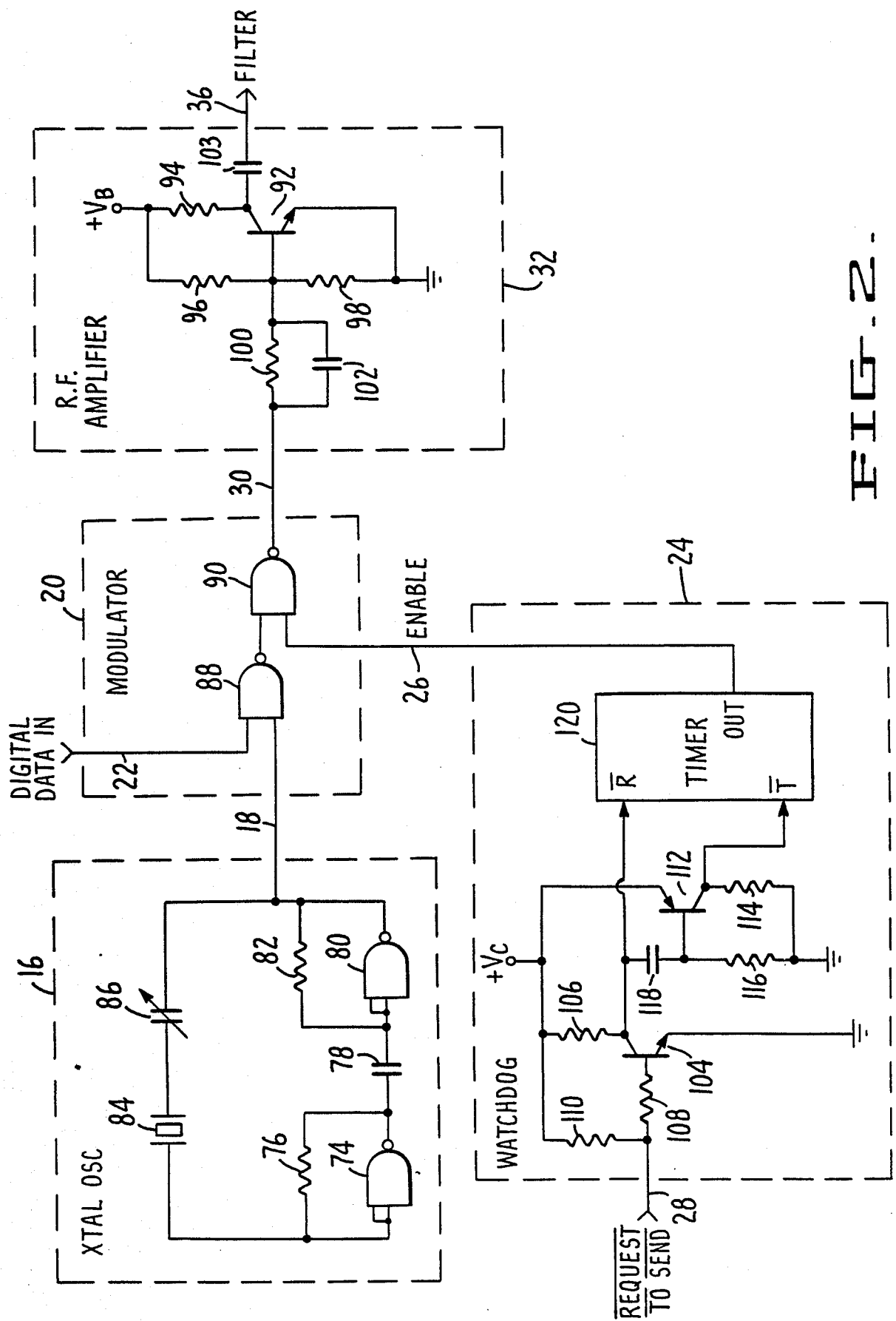
FIG. 2 is a schematic diagram showing some of the details of the crystal oscillator, radio frequency amplifier, and watchdog circuit of the transmitter section of the subject radio frequency modem.

Referring now to FIG. 2, crystal oscillator 16 of the transmitter section is implemented using a pair of gates of a quad dual-input integrated circuit NAND gates. As will subsequently be explained, the remaining two NAND aates are used in modulator 20. The output of L.O. NAND gate 74 is coupled to both inputs of gate 80 through a coupling capacitor 78. The output of gate 74 is also coupled to both inputs of the gate through a feedback resistor 76. Similarly, the output of gate 80 is coupled back to both inputs through a second feedback resistor 82. In addition, the output of gate 80 is connected to the inputs of gate 74 through a series-connected crystal 84 and trim capacitor 86. Crystal 84 is set to provide a frequency of 6.0 MHz, with trim capacitor 86 being used to set the exact desired frequency. Since the gain of gate 74 together with gate 80 is positive, a positive feedback path is established through crystal 84 and capacitor 86 so that the circuit will oscillate at the desired frequency. Feedback resistors 76 and 82 provide negative feedback which tends to linearize the digital gates to some degree.

AM modulator 20 is comprised of the remaining two NAND gates of the quad dual-input package. The output of oscillator 16 on line 18 is connected to one input of a gate 88, with the remaining input of the gate being connected to line 22 which carries the digital data to be transmitted. The output of gate 88 is connected to one input of the remaining gate 90. The second input of gate 90 is connected to line 26 which carries an enable signal provided by watchdog circuit 24. Assuming that the enable signal is high, the digital data on line 22 serves to gate on and off the RF carrier signal on line 18 so as to produce a keyed carrier A.M. output signal on line 30.

As previously noted, watchdog circuit 24 serves to prevent the subject modem from transmitting on the RF network for more than a predetermined minimum amount of time, typically 0.5 seconds. If transmissions have exceeded such predetermined amounts of time, circuit 24 will cause the enable signal on line 26 will go low, thereby inhibiting further transmissions.

Watchdog circuit 24 includes an NPN transistor 104 having a grounded $\underline{\text{emitter and a base}}$ coupled to line 28, which carries the $\overline{\text{Request To Send}}$ signal, through a resistor 108. The collector of the transistor is connected to a positive $+5$ volt power supply $+V_C$ through a resistor 106. Line 28 is also connected to the $+V_C$ power supply through a resistor 110.

The watchdog circuit 24 further includes a timer 120 which is a conventional integrated timer circuit such as the circuit manufactured by Signetics under the designation NE555. Circuit 120 has an inverted Reset input which is connected directly to the collector of transistor 104. An inverted Trigger input of timer circuit 120 is connected to the collector of an PNP transistor 112, with the collector also being connected to ground through a resistor 114. The base of transistor 112 is connected to ground through a second resistor 116 and to the collector of transistor 104 through a capacitor 118. In addition, the emitter of transistor 112 is connected directly to positive power supply $+V_C$. The output of timer circuit 120 is connected to line 26 which carries the Enable signal.

The normally-high $\overline{\text{Request To Send}}$ signal will be produced by the computer associated with the modem when the remote computer proceeds to transmit data to the central computer. Normally-on transistor 104 will be turned off by the signal and the input to the $\overline{\text{Reset}}$ input of timer 120 will go low, thereby enabling the timer. Current will also momentarily flow through capacitor 118 so as to temporarily turn off normally-on transistor 112. A short duration, negative-going pulse will be applied to the $\overline{\text{Trigger}}$ input of the timer, thereby causing a positive-going pulse to be produced on the output line 26 which serves as the Enable signal.

Timer 120 is implemented to produce a maximum pulse width of 0.5 seconds duration. Thus, even if the $\overline{\text{Request To Send}}$ signal is present longer than 0.5 seconds, the Enable signal will disappear thereby inhibiting further transmissions. Should the $\overline{\text{Request To Send}}$ signal terminate before the 0.5 second period has lapsed, transistor 104 will turn on thereby resetting timer 120. Once the timer has reset, the Enable signal will go low.

RF amplifier 32 shown in FIG. 2 includes a common emitter-configured NPN transistor 92 having a base coupled to the output of modulator 20 on line 30 through parallel-connected resistor 100 and capacitor 102. A biasing resistor 96 is connected between the base of the transistor and positive power supply voltage $+V_B$ and a second biasing resistor 98 is connected between the base and ground. The collector is connected to the positive supply voltage through resistor 94. A coupling capacitor 103 connects the collector of transistor 92 to the output line 36. Capacitor 103 serves to remove the DC component of the RF Amplitude Modulated signal provided to the filter.

As depicted in FIG. 3, filter 36 is a three-pole, high-Q, bandpass Butterworth filter. The filter includes inductors 126, 132 and 138 which are connected in series between the input line 34 and the output line 38. Parallel-connected capacitor 122 and inductor 124 are connected between input line 34 and ground. A second capacitor 128 and inductor 130 are connected in parallel between the junction of inductors 126 and 132 and ground. Finally, parallel-connected capacitor 134 and inductor 136 are connected between the junction of inductors 132 and 138 and ground.

Bandpass filter 36 serves to filter out the carrier harmonics and modulator harmonic sidebands which are especially prevalant since the transmitted data is digital rather than analog. Filter 36 is implemented to provide a 6.0 MHz center frequency and a bandwidth of 0.6 MHz. The filter also serves to match the output impedance of amplifier 32 to the impedance of the coaxial cable, which is typically 75 Ohms. If filters 36 and 40 (FIG. 1) were implemented to provide such impedance matching, it would be possible to eliminate combiner circuit 14 and connect the filters directly to the cable.

Further details of the receiver eection bandpass filter 40 and R.F. amplifier 44 will now be given in connection with FIG. 4. Bandpass filter 40 includes an input capacitor 140 connected in series with an inductor 146. A parallel-connected capacitor 142 and inductor 144 are connected between the junction of capacitor 140 and inductor 146 and ground. In addition, a parallel-connected inductor 154 and capacitor 152 are connected in series with inductor 146. A parallel-connected capacitor 148 and inductor 150 are connected between the junction of inductors 146 and 154 and ground. In addition, a capacitor 160 is connected in series with inductor 154 and the filter output line 42. A parallel-connected capacitor 156 and inductor 158 are connected between the junction of inductor 154 and capacitor 160 and ground. Finally, a parallel-connected capacitor 162 and inductor 164 are connected between output line 42 and ground.

Receiver section bandpass filter 40 is a standard 4-pole Butterworth filter having a center frequency of 73.9 MHz and a band width of 8 MHz. The filter serves to prevent spurious products, including the output of L.O. 48, from being generated on the RF data line. In this regard, capacitor 152 and inductor 154 form a trap tuned to 63.15 MHz, which is the output frequency of the receiver L.O. Filter 40 also reduces the receiver response to spurious signals entering the receiver, including signals which are at the image frequency of L.O. 48 and L.O. harmonic frequencies. Filter 40 further serves as an impedance matching element between amplifier 44 and the RF coaxial cable.

The receiver section RF amplifier 44, also shown in FIG. 4, is a single-stage amplifier having a single common emitter-configured NPN transistor 166. The output of filter 40 is connected to the base of transistor 166 through a series capacitor 178 and series inductor 176. Bias resistor 170 is connected between positive supply $+V_B$ and the junction between capacitor 178 and inductor 176. Parallel-coneected resistor 172 and capacitor 174 are disposed between the capacitor 178/inductor 176 junction and ground. The collector of transistor 176 is connected to positive supply voltage $+V_B$ and to the output line 50 which is connected to the mixer 46.

Referring now to FIG. 5, the receiver section L.O. 48 is a crystal-based Colpitts oscillator having a single NPN transistor 180. A parallel-connected crystal 190 and resistor 18 are connected between the base of the transistor and ground Crystal 190 is set to a frequency of 63.15 MHz. In addition, series-connected capacitors 192 and 194 are connected between the base of the transistor and ground, with the junction between the two capacitors being connected directly to the transistor emitter to provide positive feedback. The emitter of the transistor is also connected to ground through a resistor 196. The collector of transistor 180 is connected to positive supply voltage $+V_B$ through series-connected resistors 182 and 184. A biasing resistor 186 is connected between the junction of resistors 184 and 182 and the base of transistor 100. The collector of transistor 180 is also coupled to the output of the L.O. on line 52 through a capacitor 198. A series-connected inductor 200 and capacitor 202 are connected between the output line 52 and ground. Capacitor 202 serves as a D.C. blocking element, with capacitor 198 and inductor 200 functioning as an impedance matching network.

Receiver section mixer 46 utilizes a dual-gate MOSFET transistor 204. A transistor manufactured by Motorola, Inc., having the designation 3N201 has been found suitable for the present application. Gate G1 of transistor 204 is connected to the RF amplifier 44 output line 50 through a capacitor 212. Gate G1 is also connected to ground through a resistor 206 and a series-connected inductor 208 and capacitor 210. Gate G2 is connected directly to output line 52 of L.O. 48, to ground through bias resistor 214 and to positive supply voltage $+V_B$ through resistor 216. The substrate and source of transistor 204 are connected to ground and the drain is connected to one terminal of the primary winding of an RF transformer 222. The remaining primary winding terminal is connected to positive supply voltate $+V_B$. One terminal of the secondary winding of transformer 222 is connected to the mixer output line 54, with the remaining terminal being connected to ground.

Mixer 46 serves to combine the output of RF amplifier 44, which is applied to gate G1, with the output of L.O. 48, which is applied to gate G2. Capacitor 212 and inductor 208 provide impedance matching, with capacitor 210 serve to block D.C. Capacitor 218 and the inductance which appears at the primary winding of transformer 222 create a resonant tank circuit which is tuned to the I.F. frequency of 10.7 MHz. Resistor 220 serves to lower the Q of the tank circuit so as to provide a full bandwidth output.

Additional details of the receiver section I.F. amplifier stage 56 are shown in FIG. 6. The output of mixer 46 on line 54 is connected to the input of a filter 224, such filter preferably being a low-cost, off-the-shelf, bulk cermanic filter having a bandpass of 280 kHz and a center frequency of 10.7 MHz. Filter 224 is preferably a phase linear filter which provides good transient response. The filter narrows the receiver bandwidth, thereby reducing noise without clipping the side bands which contain the transmitted information.

Input line 54 is also connected to ground 226 through a resistor and to the input of a ceramic bulk filter 224. A ground terminal of filter 224 is also connected to ground. The output of bulk filter 224 is connected to the input of a intergrated circuit I.F. amplifier circuit 232 through a capacitor 230. The output of the filter is also connected to ground through a second resistor 228 and a ground terminal of the filter is grounded. Circuit 232 includes an I.F. amplifier having an A.G.C. input. A integrated circuit commonly used in television receivers and manufactured by Motorola, Inc. having the designation MC1349 has been found suitable for the present application. Many of the pin connections of the circuit have been deleted for purposes of simplification.

Circuit 232 is connected to power supply voltage $+V_B$ and ground. The 10.7 MHz balanced output of integrated circuit 232 is connected to the primary winding of an RF transformer 238. A center tap of the primary winding of the transformer is connected to the positive supply voltage $+V_B$. A resistor 234 and capacitor 236 are connected in parallel across the primary winding to form a resonant tank circuit. The secondary winding of transformer 238 includes one terminal which is connected to ground and a second terminal which is connected to another ceramic bulk filter 240 similar in construction to filter 242 located at the input. Filter 240 includes a grounded terminal and an output terminal which is connected to I.F. amplifier output line 58. An A.G.C. control signal produced by circuit 65 (FIG. 1) is carried on line 70 which is connected to the A.G.C. input of circuit 232.

The receiver detector 60 is a synchronous A.M. detector which is based on an integrated circuit also commonly used in television receivers. A circuit manufactured by Motorola, Inc. having the designation MC1330 has been found suitable for this application. Some of the connections to the circuit have been deleted for purposes of simplification. The circuit includes an input terminal which is connected directly to the 10.7 MHz output of the I.F. amplifier on line 58 and is connected to ground through series-connected resistor 250 and capacitor 252. The power terminal of the circuit is connected to positive supply voltage $+V_B$ and the ground connection is connected to ground. Parallel-connected inductor 246 and capacitor 248 are also coupled to the appropriate terminals of the circuit as specified in the circuit specifications which are provided with the circuit. As set forth in such specifications, an inductor 246 and capacitor 248 are connected to specified terminals of the circuit to form a tank circuit which resonates at the Intermediate Frequency. The output of the detector circuit is connected directly to output line 62 which goes to the input of the post-detector filter 64.

Referring now to FIG. 7, post-detector filter 64 is a conventional four-pole, low-pass active filter having a cut-off frequency of approximately 100 kHz. The filter serves to remove I.F. noise from the detected signal, together with spurious detector product signals. The circuit includes an input NPN transistor 254 having a base connected directly to the detector output line 62. The base of transistor 254 is also connected to ground through resistor 258 and the emitter of the transistor is connected to ground through a resistor 256. The collector of the transistor is connected directly to positive supply voltage $+V_B$.

The second stage of filter 64 includes another NPN transistor 266 with a collector coupled directly to the positive supply voltage and an emitter connected to ground through a resistor 270. The emitter of first-stage transistor 254 is connected to the base of transistor 266 through series-connected resistors 260 and 262. The junction between resistors 260 and 262 is connected to the emitter of transistor 266 through a capacitor 264, with the base of transistor 260 being coupled to ground through a capacitor 268.

The final stage of post-detector filter 64 includes a PNP transistor having a collector connected directly to ground and an emitter connected to output line 66 and to the positive supply voltage $+V_B$ through a resistor 282. The emitter of transistor 266 is coupled to the base of transistor 280 through series-connected resistors 272 and 286. The junction between resistors 272 and 286 is connected to the emitter of transistor 280 through a capacitor 284, with a base of the transistor being connected to ground through a capacitor 288.

Figure 8:
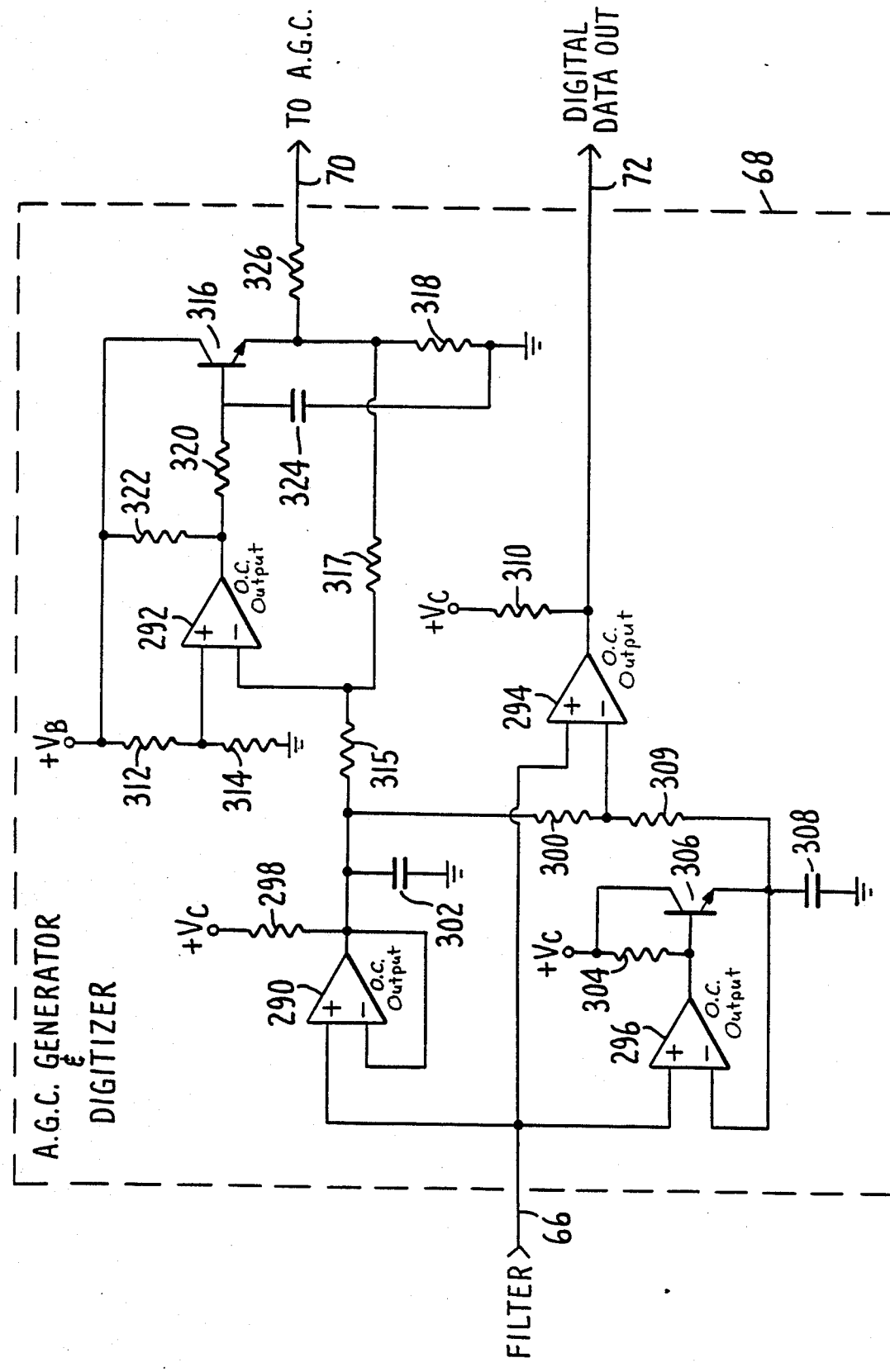
FIG. 8 is a schematic diagram of the automatic gain control generator and digitizer circuit of the receiver section of the subject radio frequency modem.

Referring now to FIG. 8, the A.G.C. generator and digitizer circuit 68 preferably utilizes a single integrated circuit having four voltage comparator circuits having open-collector output (O.C. Output) stages, such as an integrated circuit manufactured by National Semiconductor having the designation LM339N. The output of the post-detector low pass filter 64 on line 66 is connected to the non-inverting input of comparator 290, which is one of the four comparators in the integrated circuit. The output of comparator 290 is connected back to the inverting input. The output of the comparator is also connected to positive supply voltage $+V_C$, which is at $+5$ volts, through a pull-up resistor 298 and to ground through a capacitor 302.

Comparator 290 includes an internal output transistor which is capable of sinking current from the output and which is not capable of sourcing current. When the output of the post-detector filter on line 66 increases, the only source of current for capacitor 302 is resistor 298. However, the RC time constant is relatively large so that when the positive input to comparator 290 increases the voltage on capacitor 302 does not increase appreciably. However, when the voltage decreases, the output transistor of comparator 290 is capable of rapidly discharging capacitor 302. Thus, the comparator and capacitor act as a negative peak detector circuit. Detector 60 provides an inverted detected output signal, therefore the voltage across capacitor 302 represents the maximum output voltage of the demodulated signal.

A second comparator circuit 296 also has its non-inverting inpu connected to line 66. The output of the comparator is connected to voltage source $+V_C$ through a resistor 304 and to the base of an NPN transistor 306. The collector of transistor 306 is connected to supply voltage $+V_C$ and the emitter is connected to ground through a capacitor 308 and to the inverting input of the comparator. Comparator 296 and associated transistor 306 are capable of sourcing current from the emitter of the transistor, but are not effective in sinking current. Accordingly, when the detected output on line 66 goes low, transistor 306 is not capable of discharging capacitor 308, but when the output goes high, the transistor will charge the capacitor. Thus, the circuit acts as a positive peak detector.

A third voltage comparator circuit 294 is provided which has a non-inverting input terminal connected to the detected output on line 66. An inverting input of circuit 29 is connected to holding capacitor 308 through a summing resistor 309 and to holding capacitor 302 through a second summing resistor 300. Summing resistors 300 and 309 have the same impedance, therefore, the voltage presented to the inverting input of comparator 294 is approximately mid-range between the peak negative value and the peak positive value as determined by comparator circuits 290 and 296, respectively.

The output of comparator 294 is connected directly to the digital data output line 72 and to positive supply voltage $+V_C$ through a pull-up resistor 310. When the output of the filter exceeds the decision threshold voltage at the inverting input of comparator 294, the output of the comparator goes to approximately $+5$ volts. When the output of the filter goes below the decision threshold, the output goes to ground. Thus, a TTL-compatible, detected digital output signal is produced on output line 72.

The fourth and final voltage comparator 292, which is used to produce the A.G.C. control signal, has a inverting input connected to the output of the negative peak detector through a resistor 315. A series-connected pair of resistors 312 and 314 are connected between positive supply voltage $+V_B$ and ground with the junction of the two resistors being connected to the non-inverting input of the comparator. The output of the comparator is connected to $+V_B$ through a pull-up resistor 322 and to the base of an output transistor 316 through resistor 320. The collector of transistor 316 is connected to $+V_B$ and the emitter is connected to ground through a resistor 318. The emitter of transistor 316 is also connected to the inverting input of comparator 292 through a feedback resistor 317. A filtering capacitor 324 is connected between the base of transistor 316 and ground and the emitter of the transistor is connected to the output line 70 through a resistor 326.

Comparator 292 in combination with output transistor 316 function somewhat like a operational amplifier. Resistor 317 serves as a feedback element and resistor 315 serves as the input resistance, with the value of the two resisters determining the over-all gain. Resistors 312 and 314 divide the power supply voltage $+V_B$ and thus provide the reference input. Since the configuration provides an inverted output, the magnitude of the inverted A.G.C. control signal will be proportional to the magnitude of the detected signal. This will cause the detector to maintain a peak low voltage signal equal to the reference input voltage provided by resistors 312 and 314.

Thus, a novel Radio Frequency modem and method have been disclosed. Although a preferred embodiment of the modem has been described in some detail, it is to be understood that various changes could be made by persons skilled in the pertinent art without departing from the spirit and scope of the subject invention as defined in the appended claims.

We claim:

1. A radio frequency modulator/demodulator comprising:
   receiving section means for producing a demodulated data output signal from a modulated R.F. signal received on an R.F. data link, said receiving means including
   local oscillator means for generating a local oscillator signal;
   mixer means for combining said local oscillator signal and said received R.F. signal and producing an intermediate frequency signal;
   variable gain amplifier means for amplifying said intermediate frequency signal with a gain which is a function of an automatic gain control signal;
   detector means for demodulating said amplified intermediate frequency signal;
   digitizing means for receiving a demodulated output signal from said detector means and for producing a digital data output signal, said digitizing means including
   (a) first peak signal means for producing a first peak signal representative of a maximum excursion of said demodulated output signal in a first direction, said first peak signal means comprising a first comparator circuit;
   (b) second peak signal means for producing a second peak signal representative of a maximum excursion of said demodulated output signal in a second direction opposite said first direction, said second peak signal means comprising a second comparator circuit;
   automatic gain control signal generating means for producing said automatic gain control signal indicative of the amplitude of said demodulated output signal in response to said first peak signal, said automatic gain control signal generating means comprising a third comparator circuit; and
   transmitting section means for producing a modulated R.F. signal output signal on the data link utilizing an input data signal.

2. The radio frequency modulator/demodulator of claim 1 wherein said digitizing means includes a fourth comparator circuit for comparing a threshold signal, derived from said first and second peak signals, and wherein said digitizing means produces said digital data output signal in response to a comparison by said fourth comparator circuit of said demodulated output signal and said threshold signal.

3. The radio frequency modulator/demodulator of claim 2 wherein said first, second, third and fourth comparator circuits are embodied in a common monolithic integrated circuit.

4. The radio frequency modulator/demodulator of claim 3 wherein said first, second, third and fourth comparator circuits have open-collector output stages and wherein said digitizing means includes a first discrete transistor driven by one of said first and second comparator circuits.

5. The radio frequency modulator/demodulator of claim 4 wherein said automatic gain control means includes a second discrete transistor driven by said third comparator circuit and a resistive feedback network coupled between an input of said third comparator circuit and said second discrete transistor.

6. The radio frequency modulator/demodulator of claim 3 wherein said transmitting section means includes:
   R.F. generating means for generating an unmodulated digital R.F. signal utilizing first and second digital gates;
   modulating means for producing said modulated R.F. signal, said modulating means including a third digital gate having a first output which receives said unmodulated digital R.F. signal and a second input which receives the input data signal.

7. The radio frequency modulator/demodulator of claim 6 wherein said first, second and third digital gates are embodied in a common monolithic integrated circuit.

* * * * *